(12) United States Patent
Hancock

(10) Patent No.: US 7,502,024 B2
(45) Date of Patent: Mar. 10, 2009

(54) TEXTURE BASED CIRCULAR ARC GENERATION

(75) Inventor: William R. Hancock, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 550 days.

(21) Appl. No.: 10/671,099

(22) Filed: Sep. 25, 2003

(65) Prior Publication Data
US 2005/0068328 A1 Mar. 31, 2005

(51) Int. Cl.
G06T 7/20 (2006.01)
G09G 5/00 (2006.01)

(52) U.S. Cl. ........................ 345/423; 345/582
(58) Field of Classification Search ......... 345/419–428, 345/582, 584, 585, 441, 443, 467–470, 440
See application file for complete search history.

(56) References Cited

U.S. PATENT DOCUMENTS

| | | | |
|---|---|---|---|
| 4,649,378 A | | 3/1987 | Johnson et al. |
| 4,716,460 A | | 12/1987 | Benson et al. |
| 4,931,801 A | | 6/1990 | Hancock |
| 4,941,116 A | | 7/1990 | Hancock et al. |
| 5,074,645 A | | 12/1991 | Gold et al. |
| 5,179,377 A | | 1/1993 | Hancock |
| 5,189,729 A | | 2/1993 | Hancock |
| 5,224,208 A | * | 6/1993 | Miller et al. .................. 345/609 |
| 5,227,786 A | | 7/1993 | Hancock |
| 5,315,537 A | | 5/1994 | Blacker |
| 5,319,744 A | * | 6/1994 | Kelly et al. ................... 345/647 |
| 5,335,319 A | * | 8/1994 | Obata ........................... 345/441 |
| 5,339,092 A | | 8/1994 | Johnson et al. |
| 5,461,706 A | * | 10/1995 | Trow et al. ................... 345/585 |
| 5,579,456 A | * | 11/1996 | Cosman ....................... 345/419 |
| 5,768,156 A | | 6/1998 | Tautges et al. |
| 5,900,881 A | * | 5/1999 | Ikedo ........................... 345/426 |
| 6,226,000 B1 | * | 5/2001 | Richens et al. ............... 345/419 |
| 6,271,866 B1 | | 8/2001 | Hancock et al. |
| 6,307,565 B1 | | 10/2001 | Quirk et al. |
| 6,518,968 B1 | * | 2/2003 | Ritter et al. .................. 345/426 |
| 6,606,089 B1 | * | 8/2003 | Margadant .................... 345/419 |
| 6,621,451 B1 | * | 9/2003 | Fisher et al. ................. 342/185 |
| 2004/0160453 A1 | * | 8/2004 | Horton et al. ................ 345/582 |
| 2004/0233210 A1 | | 11/2004 | Hancock et al. |
| 2004/0233230 A1 | | 11/2004 | Hancock |
| 2004/0263516 A1 | * | 12/2004 | Michail et al. ............... 345/441 |
| 2005/0035979 A1 | * | 2/2005 | Mukoyama et al. .......... 345/619 |
| 2005/0060515 A1 | | 3/2005 | Hancock |
| 2005/0110804 A1 | | 5/2005 | Hancock et al. |
| 2005/0162434 A1 | | 7/2005 | Hancock |
| 2005/0206645 A1 | | 9/2005 | Hancock |

OTHER PUBLICATIONS

Foley, Computer Graphics: Principles and Practive, Second Edition, Chapter 11, pp. 473-530.*

* cited by examiner

*Primary Examiner*—Kee M Tung
*Assistant Examiner*—Aaron M Richer
(74) *Attorney, Agent, or Firm*—Ingrassia Fisher & Lorenz, P.C.

(57) ABSTRACT

High fidelity arcs are produced using a set of interconnected trapezoids, which are transmitted in a highly efficient triangle mesh to a graphics rendering device. Perspective correction capabilities of a graphics engine are used to map a small rectangular texture patch onto the trapezoids, such that the circle appears completely smooth. Anti-aliasing line profiles are applied such that super-sampling is only required in a single dimension.

9 Claims, 7 Drawing Sheets

TEXTURE BASED CIRCULAR ARC GENERATION

FIELD OF THE INVENTION

The present invention relates to circular arc generation, and in particular to texture based circular arc generation.

BACKGROUND OF THE INVENTION

Drawing circles on electronic devices, such as display devices has not been a straight forward endeavor. Existing circular arc generators consist of a series of chained straight-line vectors (chords) connecting points along a perimeter of the desired circular arc. The higher number of vectors or lines in the arc, the better the fit to the desired curve. Circles with large radius can require hundreds of these vectors to obtain reasonably high fidelity.

This existing approach requires a trade-off between circular arc fidelity and processing/rendering throughput to handle numerous vertices. In general, this tradeoff typically results in a circle and circular arcs which have obvious discontinuities where the chords are clearly visible. Custom solutions embody hardware acceleration of arcs, but existing commercially available graphics chipsets do not have such features. The arcs also tend to be of lower image quality due to the limited line anti-aliasing that is available with most graphics chips.

Textures have been used in other approaches. In one such approach, a trapezoid is used as the texture, drawn within a large rectangle. However, this approach is wasteful in terms of storage, and also requires two-dimensional super sampling. Further approaches have attempted to use a large circular texture drawn within a large quadrilateral. This again requires a large amount of storage to hold the texture.

SUMMARY OF THE INVENTION

High fidelity arcs are produced using a set of interconnected trapezoids, which are transmitted in a highly efficient triangle mesh to a graphics rendering device. Perspective correction capabilities of a graphics engine are used to map a small texture patch onto the trapezoids, such that arcs appear completely smooth. In one embodiment, the texture patch has a rectangular shape. Anti-aliasing line profiles are applied such that super-sampling is only required in a single dimension.

In one embodiment, a circle is rendered using textures corresponding to trapezoidal radials of the circle. The textures are rectangles having texture elements (texels) that extend from a lower corner of the rectangle, to the top of the rectangle and back to the other lower corner of the rectangle. The texture has columns with a gradient of intensity from dark to light, and back to dark. The light part of the texture corresponds to a center of a line used to represent the circle, with the width of the line being defined by the distance between dark intensity portions of the texture.

In one embodiment, the circle is broken into multiple radials, with the line defining the circle broken into arcs corresponding to the radials. Each arc defines a trapezoid, with the width of the trapezoid defined by the radial, and the height fixed such that the bottom edge of the trapezoid forms a chord on the inside of the circle (inside portion of the line defining the circle touches the left and right bottom of the trapezoid), and the center of the top edge of the trapezoid forms a tangent to the outside of the line defining the circle.

The rectangular texture is mapped to the trapezoid using bilinear or nearest neighbor interpolation to fill in pixels. In one embodiment, the trapezoid is broken into triangles, and the textures are mapped by a graphics engine to the triangles.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system. The algorithms can also be implemented in hardware using common control logic such as an FPGA or ASIC.

High fidelity arcs are produced using a small set of incremental vertices that are transmitted in a highly efficient triangle mesh to a graphics rendering device. Perspective correction capabilities of a graphics engine are used to map a small rectangular texture patch onto a series of trapezoids, such that the circle appears completely smooth. Anti-aliasing line profiles are applied such that super-sampling is only required in a single dimension.

Figure 1:
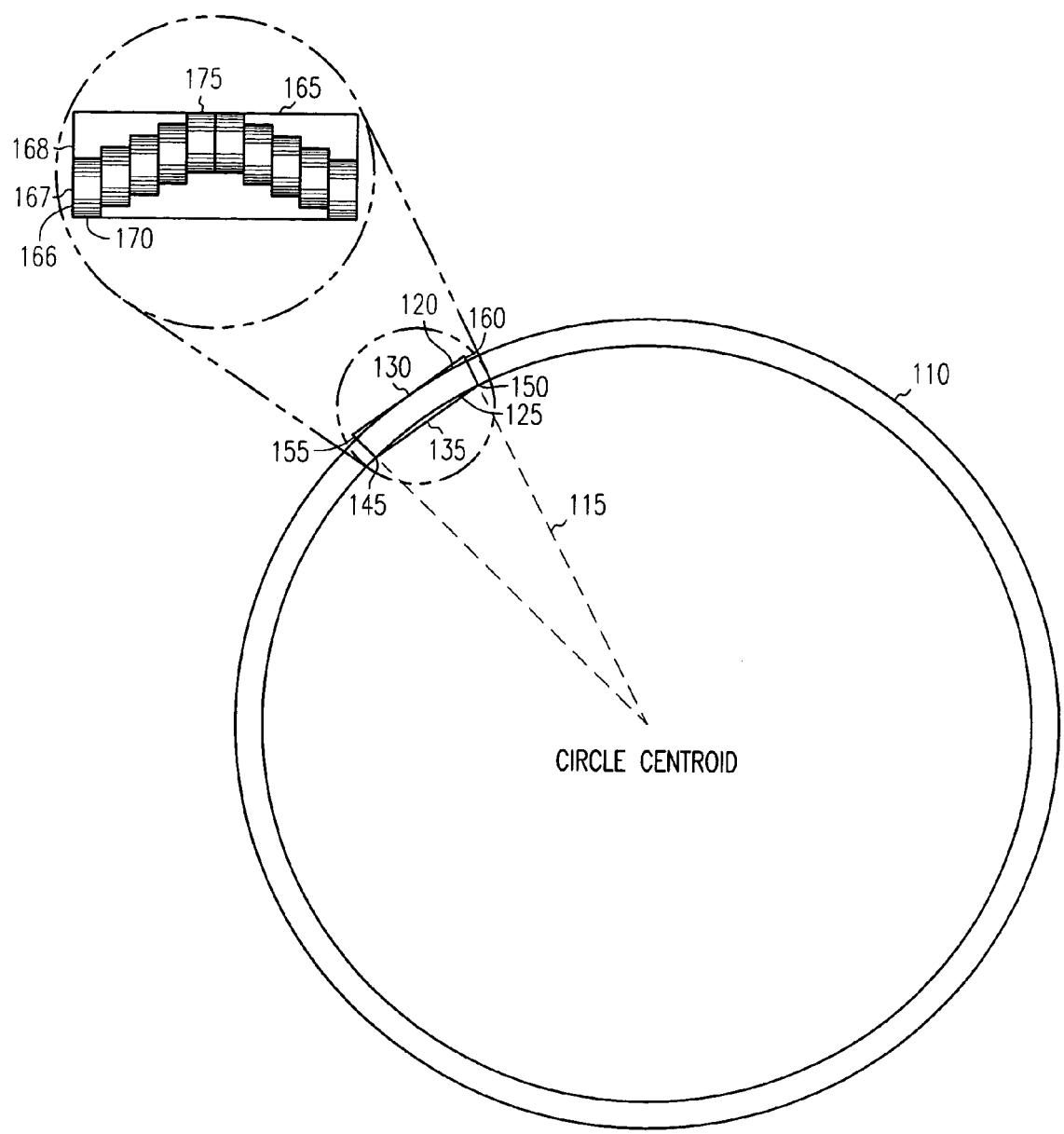
FIG. 1 is a diagram of a circle and texture to be mapped to a trapezoid corresponding to an arc of the circle.

A representation of a circle 110 defined by a line having a predetermined width is shown in FIG. 1. A radial portion of the circle 110 is shown at 115, which defines an arc 120. A trapezoid 125 is defined around the arc 120, and has a long side 130 of the trapezoid is a tangent to the outside of the line defining the circle 110. A short side 135 of the trapezoid is a chord extending between two endpoints 145 and 150 of the arc at the inside of the line defining the circle 110. The equal length sides 155 and 160 of the trapezoid follow radii of the radial portion 115 and extend radially between the long side 130 and the short side 135.

A rectangular texture map 165 is formed corresponding to the arc for use in drawing the arc. While the use of a rectangle for the texture provides optimal use of memory, in further embodiments, shapes other than rectangles may be used, such as quadrilaterals, equilaterals, trapezoids, or other shapes deviating from a rectangle including different polygons and/or circles.

Texture mapping is the addition of a separately defined texture or pattern to a surface. The process involves the mathematical mapping of the texture from one domain to another. In this case, the texture typically modulates the base color of the line based on the intensity level of the individual texels. A texture map is a rectangular array of texels. The texels can be of single intensity or varied intensity and color as desired. A texture is mapped to the surface of an object. The object is represented as a polygonal or triangle mesh. Texture map coordinates are then assigned to each vertex of the triangle. The object is then rendered into pixels for display on a display device. Linear interpolation is used to associate texels with a given pixel. One pixel may cover only a small part of a texel, or one pixel may cover all or part of many texels.

Texture map 165 is comprised of multiple rows and columns of texels. Each column in the texture 165 has a gradient intensity from dark or black as seen at 166 to bright at 167 and back to dark or black at 168. The brightest spot 167 corresponds to the center of the line defining circle 110, and the black portions 166 and 168 correspond to the inside and outside edges of the line defining circle 110 and to all texels not between the inner and outer edge of the line. A first row 170 begins at a first lower corner of the rectangle. The first lower corner maps to an endpoint, such as endpoint 145 of the arc 120 and the entire row contacts line 135 of the rendering trapezoid with the last column mapping to point 150. Rows then extend toward a upper corner of the rectangle, moving toward a top 175 of the rectangle, corresponding to the point on the arc where the longer side 130 contacts the outer edge of the arc. This mapping of row from bottom to top is arbitrary and can easily be reversed.

This combination of rows forms a symmetrical texture about the center column that can be drawn from either left to right, or right to left. This is useful when the trapezoid is broken into triangles, and the texture is mapped to a triangle mesh containing these triangles.

Figure 2:
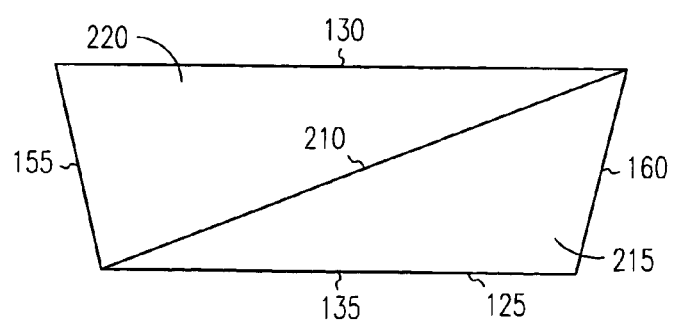
FIG. 2 is a diagram of a trapezoid being mapped into triangles.

An example of a trapezoid 125 being broken into triangles for mapping by a graphics engine is shown in FIG. 2 where line 210 is drawn from one corner to another. This results in two different size triangles being formed as seen at 215 and 220. Triangle 215 is bounded by side 160, line 210 and short side 125. Triangle 220 is bounded by side 155, line 210 and long side 130. Thus, triangle 220 is larger than triangle 215. This can result in distortion when the texture is mapped to it. Perspective correction is used to maintain orthogonality for mapping of the texture into the triangle strip. A reverse mapping of this perspective distortion during generation of texture is used to minimize distortion in the texture mapping. In addition, if the hardware divides the trapezoid from the top left to the bottom right then different distortion will occur. However by applying proper perspective correction, the trapezoids will appear identical independent of how the hardware tessellates the trapezoid.

A circle or arc is represented by many smaller arcs segments, each corresponding to the texture. These smaller arcs are added together to make the larger arc. The graphics engine rotates and translates trapezoids to generate the larger arc or full circle. However, they may not add up to the entire arc or circle, leaving a partial arc to complete the arc or circle. In this event, a final trapezoid is custom calculated to compensate for the start and stop position along the trapezoid, or chords of the angle spanned by the final segment.

Figure 3:
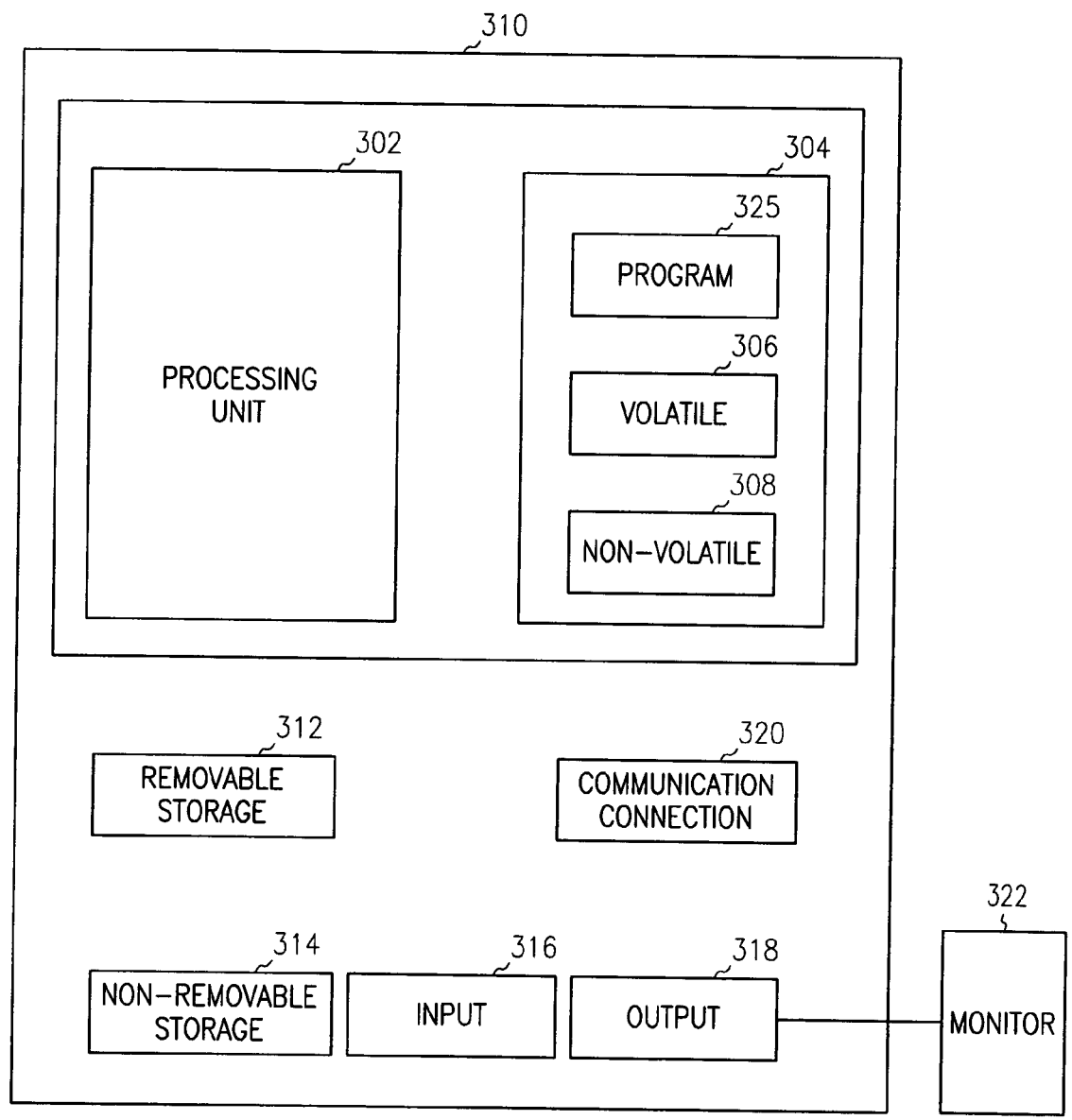
FIG. 3 is a block diagram of a typical computer system for implementing one embodiment of the present invention.

A block diagram of a computer system that executes programming for performing the above algorithm is shown in FIG. 3. A general computing device, or a device specialized for graphics in the form of a computer 310, may include a processing unit 302, memory 304, removable storage 312, and non-removable storage 314. Processing unit 302 may also comprises specialized available graphics chipsets. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318 and a communication connection 320. In one embodiment, a graphics display device 322, or other type of display device is coupled to output 318. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a computer-readable medium. For example, a computer program 325 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 300 to provide generic access controls in a COM based computer network system having multiple users and servers.

Figure 4:
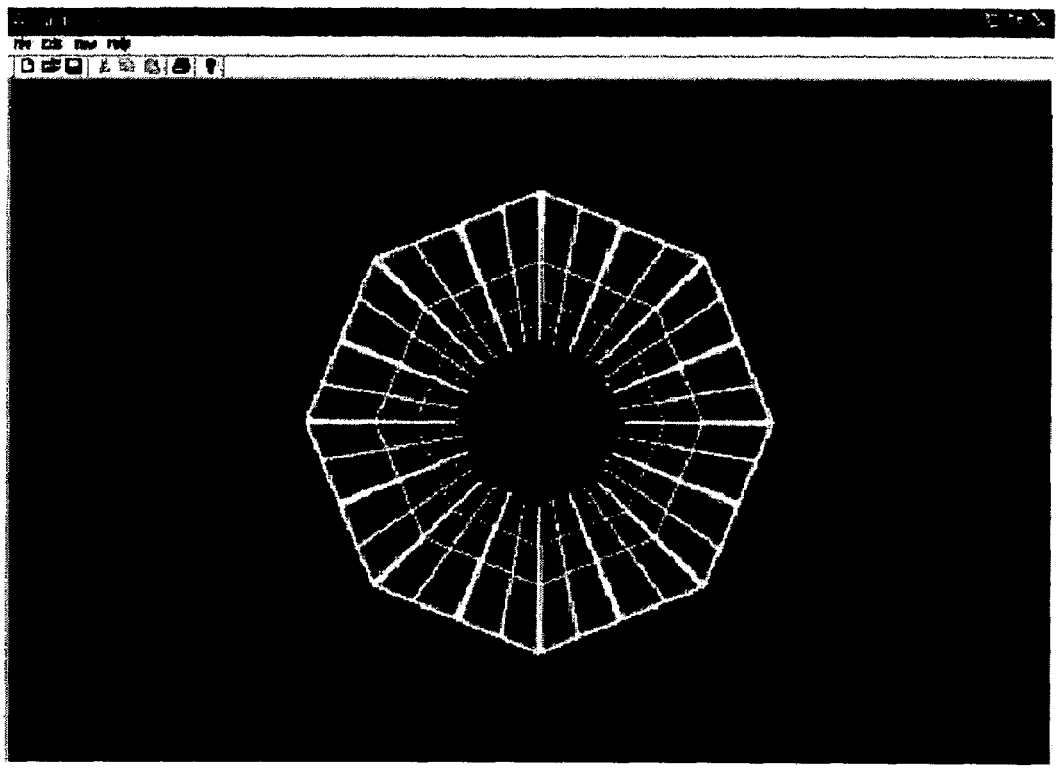
FIG. 4 is an example screen shot of a texture with selected columns and rows filled with full intensity and the rest with black, mapped onto a trapezoid with proper perspective correction.
Figure 5:
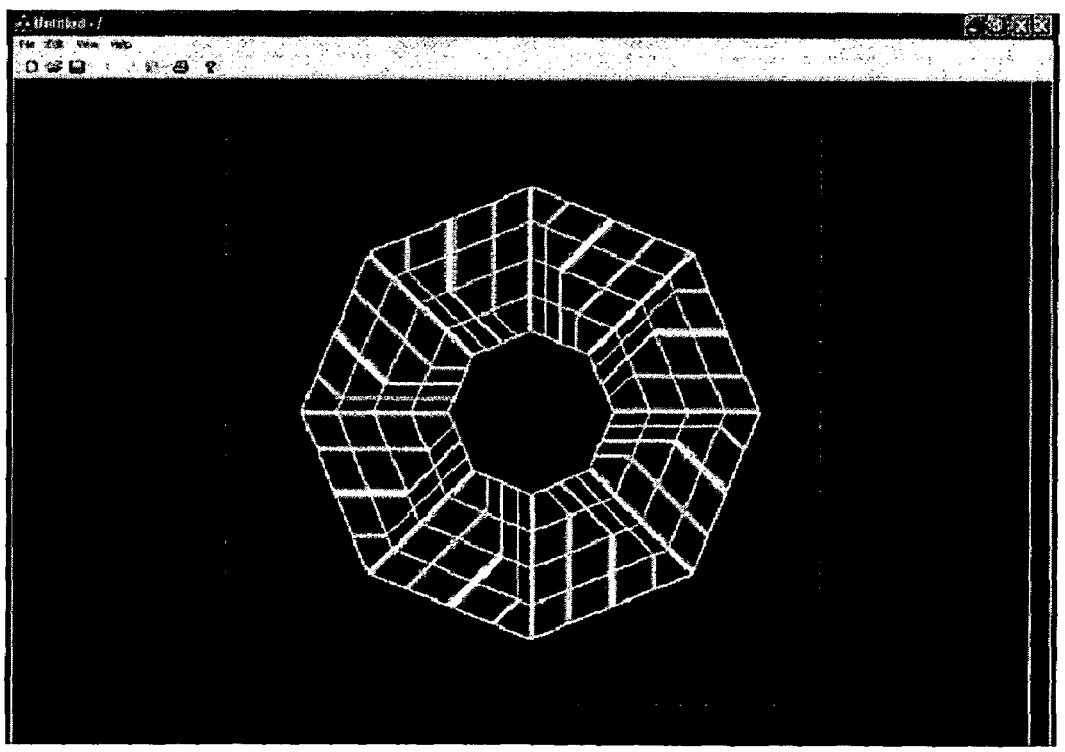
FIG. 5 is an example screen shot of the texture grid of FIG. 4 without perspective correction.

FIG. 4 shows a texture with selected columns and rows filled with full intensity and the rest with black (forming a grid of equal size rectangles in texture) that is mapped onto a trapezoid with proper perspective correction. FIG. 5 shows the same texture grid without perspective correction.

Figure 6:
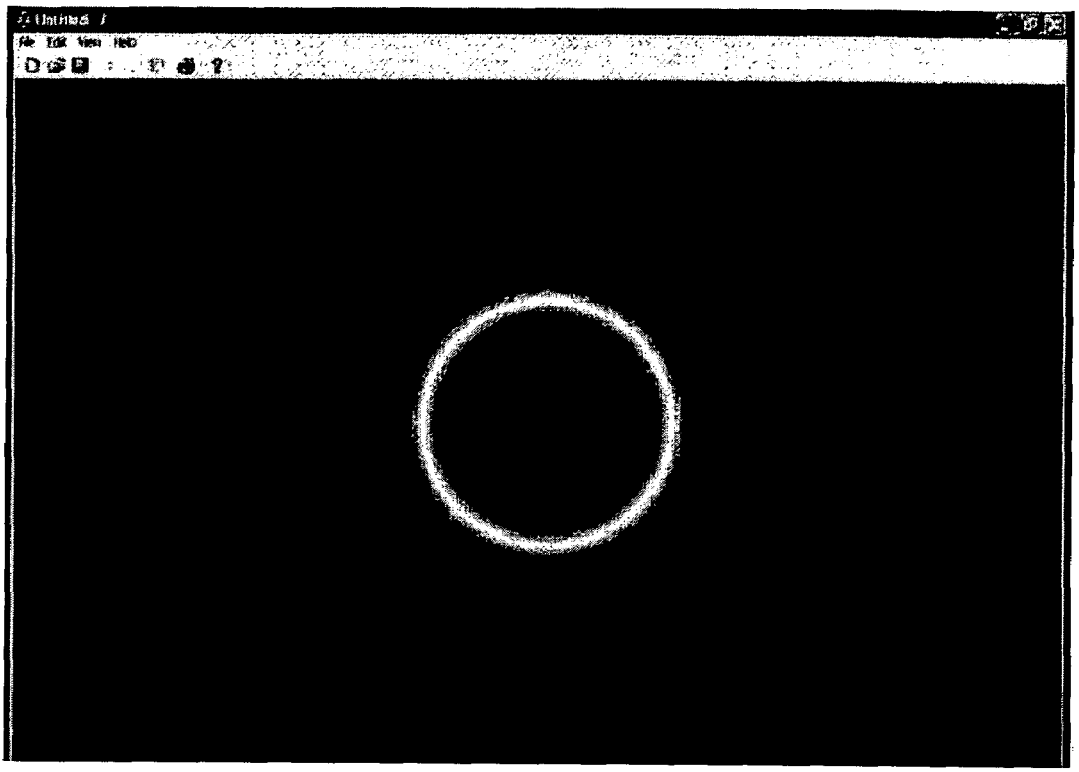
FIG. 6 is an example screen shot of a circle rendered in accordance with an embodiment of the present invention.
Figure 7:
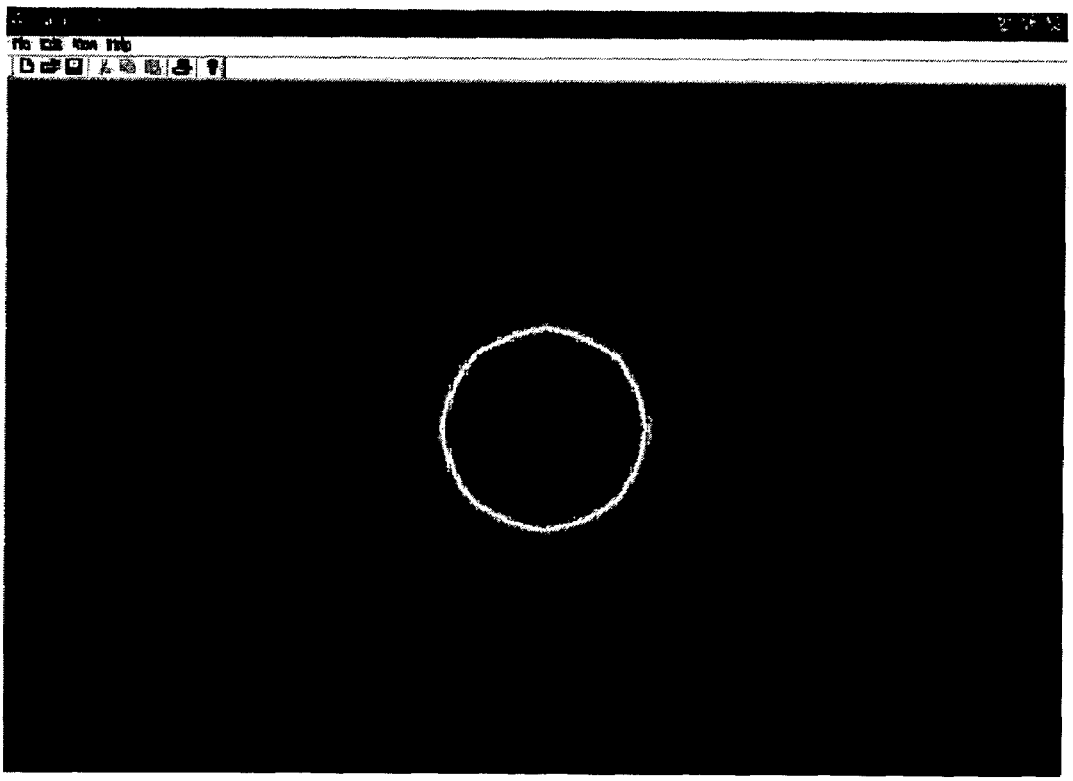
FIG. 7 is an example screen shot of the circle of FIG. 6 rendered without reverse perspective mapping.
Figure 8:
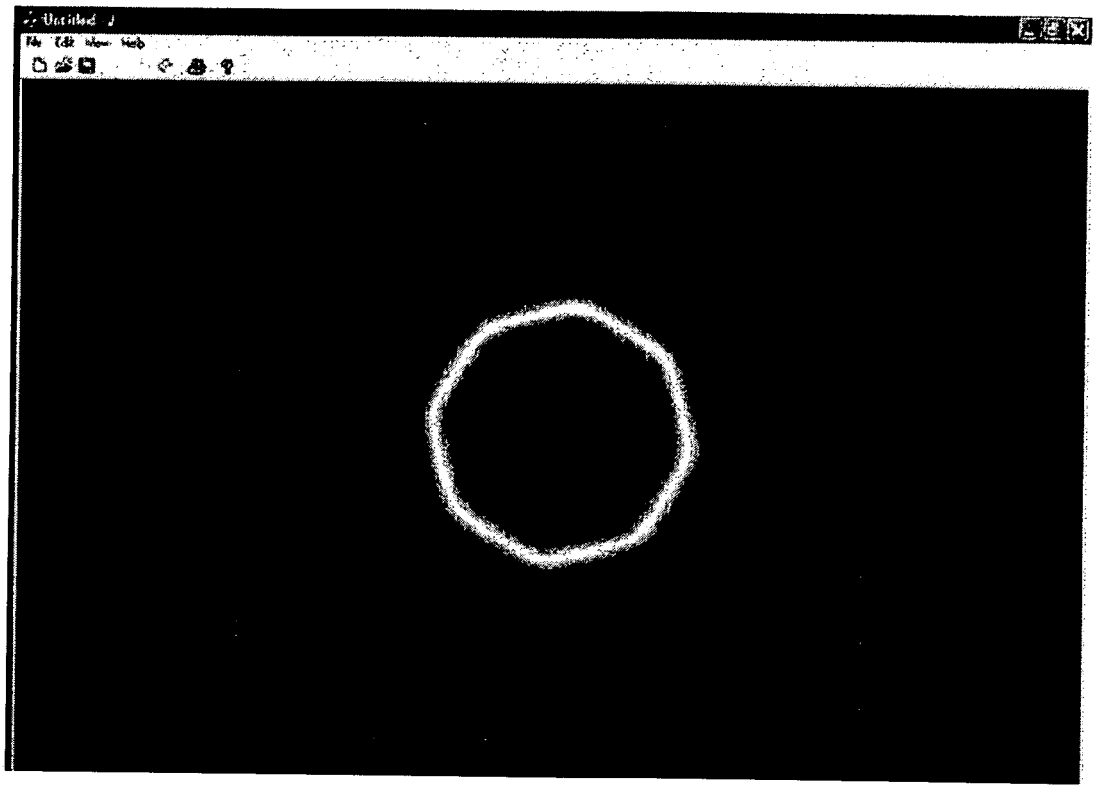
FIG. 8 is an example screen shot of the circle of FIG. 6 rendered without perspective mapping.

FIG. 6 shows a circle rendered with the algorithms described herein. FIG. 7 shows the same circle rendered without reverse perspective mapping; notice that the circle is smaller and distorted. FIG. 8 shows the same circle rendered without perspective mapping, notice that the circle is heavily distorted.

Figure 9:
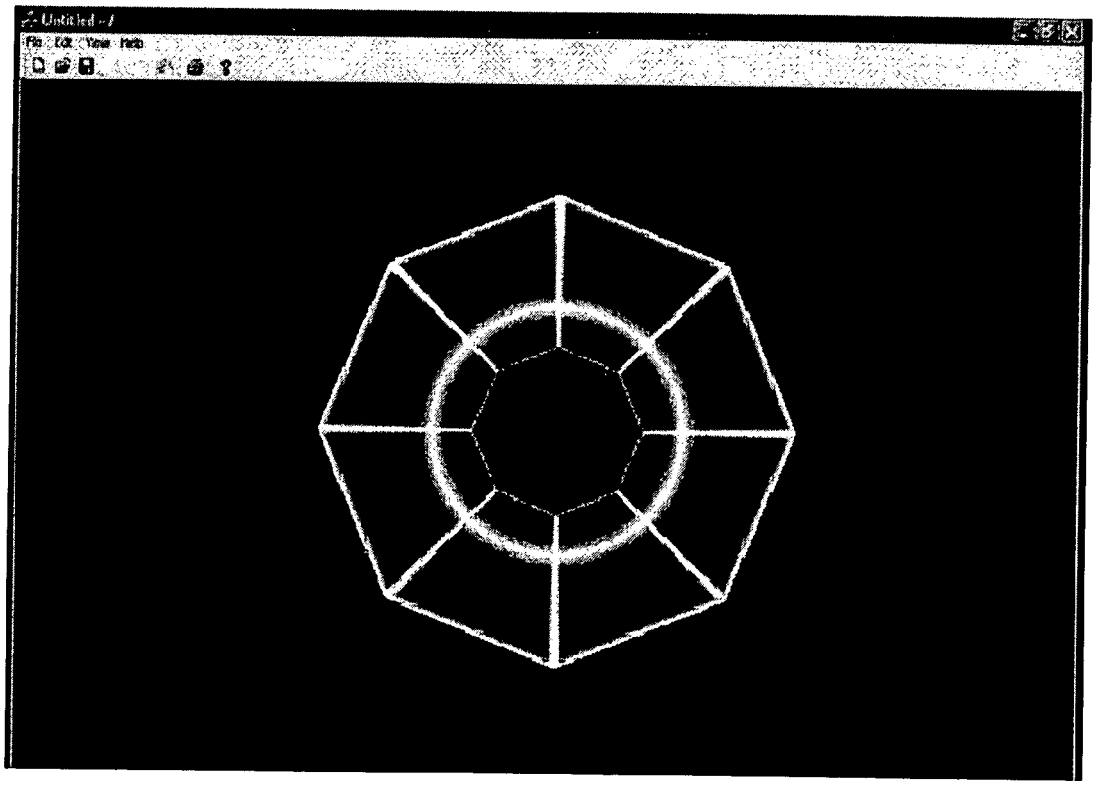
FIG. 9 is an example screen shot of the circle of FIG. 4, but with the edges of a rendering trapezoid shown.

FIG. 9 shows the same circle as FIG. 4, but with the edges of the rendering trapezoid shown. Notice that 8 trapezoids were used, which reflects the 45 degree limit inserted in this implementation.

Figure 10:
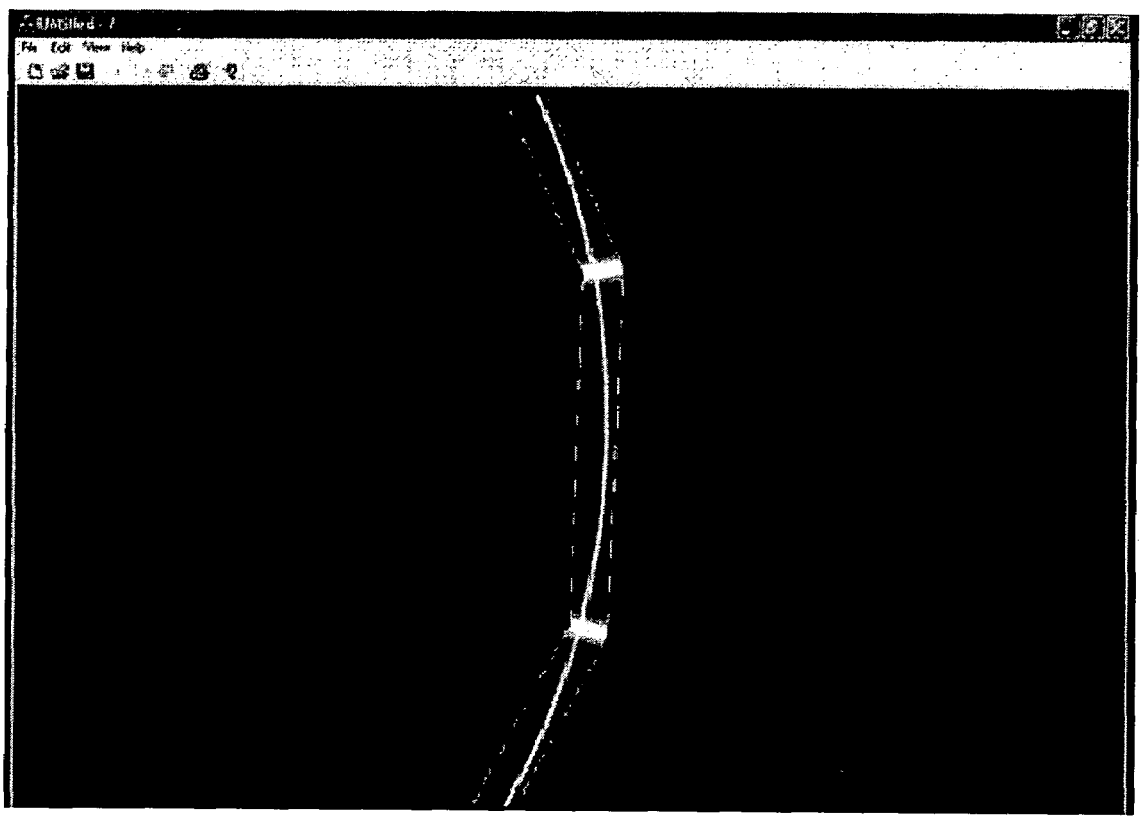
FIG. 10 is an example screen shot of a larger circular arc inside its rendering trapezoid.

FIG. 10 shows a much larger circular arc inside its rendering trapezoid. Notice that the inner edge is a circular chord and the outer edge is a tangent. Also note that because each column represents multiple radials, there is slight distortion of the arc.

Further details of algorithms used to implement one embodiment of the present invention are now provided. An array of control values is formed for each arc generated. This array is sized appropriately for the number of arcs expected. In this example the system provides sufficient texture memory and control array entries to hold 16 arcs. For each arc encountered, the radius and line width is compared to the existing control entries. If a match is found, then that existing texture is used. If no match is found, then a new texture is generated for this line width and radius. The control array is then updated with the new values for this texture, including the texture identifier, radius, line width and other pertinent information such as span angle and q_factor. In the event, the control array is already full, then either an old texture must be discarded or this one must be ignored or the circle can be generated with conventional line segments.

The size of the texture is first selected, and then the radial span of the trapezoid is determined from that. In one embodiment, the texture patch is 64 texels tall and 32 texels wide. Each texel represents ¼ of a pixel along each column (for super-sampling the image to achieve anti-aliasing). The algorithm can also be set to fix the span angle and then calculate the texture size from that, but having variable sized texture patches makes it more difficult to control memory allocations and total memory required. The texture patch appears as a rectangular block in memory (a 2-dimensional array), where each row is 32 elements wide and each column is 64 element tall. This rectangular patch is then mapped into the trapezoid shape during rendering. The data is stored into the rectangular patch such that each column represents a radial through the trapezoid at the same relative offset along the bottom of the trapezoid from the center of both the trapezoid and the rectangular patch. The texture patch is generated for a horizontal trapezoid and then rotated to whatever angle is needed. The texture patch is basically the trapezoid unfolded to make a rectangle and then heightened to achieve anti-aliasing. The texture mapping process reverses this process and maps the rectangular texture into the trapezoid of the arc segment.

The actual span angle can be selected to maximize image quality or to minimize the number of trapezoids for a full circle. If the number of trapezoids is minimized, the resulting image quality is slightly less than the former. The image quality is maximized by forcing each column to represent one pixel. In one embodiment, the radial span is selected to maximize the length of the arc segment by forcing the center of the arc to the 25% point at the first (and last) column and at most the 75% point at the center column. This allows the line width of the actual arc to be up to 50% of the height of the texture (in one embodiment that represent a half-line width of 4 pixels). Note that the 25% and 75% points are arbitrary and other points may be used as desired. An algorithm for calculating the angular span of the trapezoid is as follows:

```
span_cos = Radius/(Radius + (0.75 – 0.25)*texture_size)
span_radians = 2.0*acos(span_cos);
if (span_radians > (PI/4.0f)) span_radians = PI/4.0f;
span_angle = (float)span_radians*180.0/PI;
```

An algorithm to maximize image quality, in one embodiment, is as follows:

```
span_cos = Radius/(Radius + (0.75 – 0.25)*texture_size)
span_radians = 2.0*acos(span_cos);
arc_pixel_height = Radius * sin(span_radians/2.0);
arc_pixel_height = arc_pixel_height * (number of pixels/inch)
arc_pixel_height = arc_pixel_height/(number of columns/2);
if (arc_pixel_height > MIN_HEIGHT)
        span_radians = span_radians* MIN_HEIGHT /
        arc_pixel_height;
if (span_radians > (PI/4.0f)) span_radians = PI/4.0f;
span_angle = (float)span_radians*180.0/PI;
```

Where Radius is the radius of the arc and texture_size is the height of the texture in the same units as Radius. The second algorithm tries to fit into the 25-75% points, but then reduces the span angle if columns are repeated for too many pixels. For optimum appearance, MIN_HEIGHT would be 1.0. MIN_HEIGHT=2.0 is only slightly lower quality and 4.0 starts to be noticeable. Note that the separation can be set based on the line width, for even more performance optimization. Also, a line width larger than 4, would need to reduce the separation proportionally. The span angle is arbitrarily limited to 45 degrees to avoid a special case with a very small radius. The algorithm still works with span angle up to 90 degrees, but slight errors start to become noticeable as the span angle becomes larger.

From here, the inner, outer radius and q_factor can be calculated as:

```
inner_radius = Radius – texture_size*0.25;
outer_radius = Radius + texture_size*0.75;
q_factor = inner_radius/outer_radius.
```

The equation for spa_cos in paragraphs 27.28 is derived from the following relationship: (Radius–inner_radius*cos(span_angle/2))/(outer_radius*cos(span angle/2)–inner_radius*cos(span_angle/2)=0.75. In other words, the relative offset to the radius along the center column of the trapezoid should be at 75%. Substituting for inner_radius and outer_radius results in (Radius–(Radius–0.25*texture_size)*cos(span_angle/2))/(texture_size*cos(span_angle/2))=0.75. This reduces to Radius/cos(span_angle/2)=Radius+(0.75–0.25)*texture_size, from which the final equation is easily derived.

The q_factor is the critical perspective correction factor during image rendering. It is typically calculated by dividing the narrow width of the trapezoid (bottom) by the wide width (top), but the bottom=2*inner_radius*cos(span_angle/2) and the top is 2*outer_radius*cos(span_angle/2), so that reduces down to the equation specified. This q_factor calculation is well known in the art.

A circle with a given start angle and delta angle (360 degrees for a full circle) is then drawn iteratively, starting at the specified start angle and drawing full segments of span_angle until the delta angle will be exceeded. The last segment is drawn partially to cover the remaining angle in the circle. The algorithm for drawing a full arc segment and the final partial arc segment is presented as pseudo-code later in the detailed description.

The generation of the arc texture is now described. Each column in the texture patch represents a single radial that intersects the trapezoid. The center column is built to be at 0 degrees and the first and last column to be at +/− span_angle/2. Each column in between is then equally spaced spatially along the bottom of the trapezoid. However, the center column is shorter spatially than the first and last column. In addition, there is the complication of reverse mapping the perspective correction that is applied by the hardware. FIG. 4 shows how a texture composed of grid lines mapped into a series of trapezoids maintains angular consistency, but at the price of spatial integrity (generates a spider web effect). With lines in equally spaced rows, the result is compression towards the narrow end of the trapezoid and expansion at the outer edge. The compression can be safely ignored between columns, but not between rows. Note that the bigger the span_angle, the more severe is the effect. FIG. 5, for reference, shows what happens if perspective correction is not applied during rendering. Notice that the rows are properly spaced, but the columns are "bent" where the trapezoid is segmented into two triangles. The method of applying reverse perspective view compensation improves the appearance of the circle.

Figure 11:
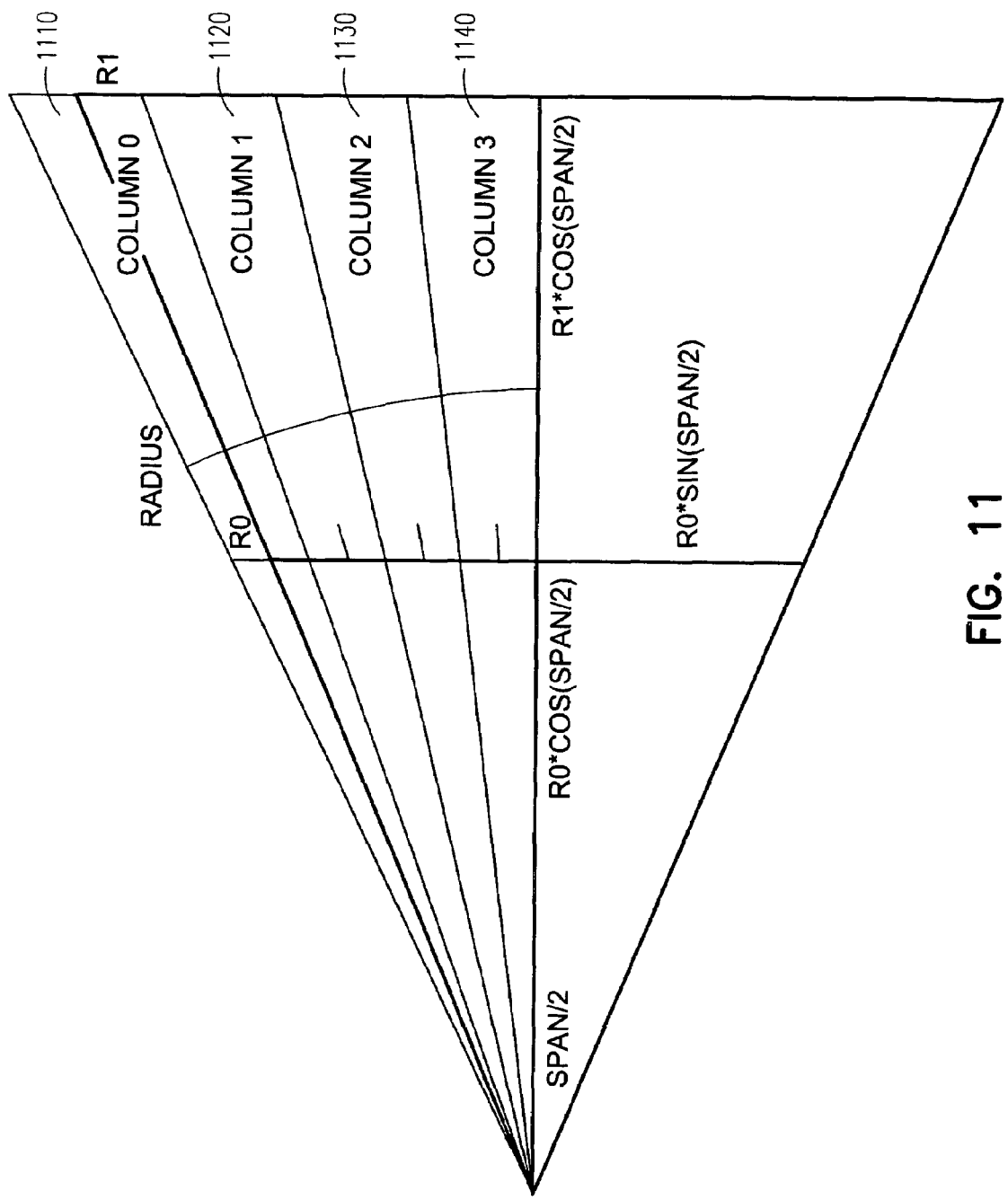
FIG. 11 is diagram example of a trapezoid being divided into 8 columns showing the geometry of the process.

In one embodiment, the texture patch is built by columns from center to first and then can be symmetrically filled with the same data from center to last column. Note that with an even number of columns, there are actually two center columns, both slightly rotated from 0. The length of the bottom of the trapezoid is 2*inner_radius*sin(span_angle/2). The distance between columns along the bottom is total length/(number of columns−1). The offset to the center column is one half that distance. FIG. 11 shows the geometry of mapping the columns into the trapezoid for the case where there are only eight columns, four of which are shown at 1110, 1120, 1130 and 1140.

The following pseudo code has two arrays: arc_YY_to_t and arc_t_to_YY, these allow mapping between YY and T, where YY is the column and T is the texture coordinate after performing the reversed perspective view transformation. The formation of these two arrays is discussed later.

The pseudocode for an example algorithm to generate the circular arc texture patch is now presented:

```
Initialize the texture patch to contain all zeros.
arc_center_base_yy = radius of arc in sub-pixels
arc_start_radius = arc_center_base_yy − 0.25*(number of rows)
arc_start_radius is the radius in subpixels at the outer edge of the bottom of the trapezoid
arc_column_delta = 2*arc_start_radius*sin(span_angle/2)/(number of columns − 1)
arc_column_delta is the distance between columns along the bottom of the trapezoid.
arc_column = arc_column_delta/2;
arc_column is the location of the center column.
arc_stop_radius = arc_center_base_yy + 0.75*(number of rows)
arc_stop_radius is the radius in subpixels at the outer edge of the top of the trapezoid.
arc_start_radius = arc_start_radius * cos(span_angle/2)
arc_start_radius is now the inner radius at the center of the trapezoid
arc_stop_radius = arc_stop_radius * cos(span_angle/2)
arc_stop_radius is now the outer radius at the center of the trapezoid
Do the following for each column (center to first column: XX = number of columns/2 −1
to 0):
{
         arc_angle = atan(arc_column/arc_start_radius);
         use the arc tangent of the height divided by the width to get arc_angle,
         which is the angle to the center of this column from the center of the trapezoid.
I        Note: columns are equally spaced along the bottom of the trapezoid not angularly.
         arc_start_yy = arc_start_radius/cos(arc_angle);
         arc_start_yy is the radial distance to the first row of this column.
         arc_stop_yy = arc_stop_radius/cos(arc_angle);
         arc_stop_yy is the radial distance to the last row of this column.
         arc_zero_yy = (arc_center_base_yy − arc_start_yy)/ (arc_stop_yy − arc_start_yy);
         arc_zero_yy is the relative offset to the center of the line in this column (at radius)
         arc_zero_yy = arc_zero_yy * (number of rows);
         arc_zero_yy is the row offset in this column of the center of the line.
         arc_scale = (arc_stop_yy − arc_start_yy)/(number of rows);
         arc_scale is the compression factor of each pixel in the column.
         arc_zero_T = arc_YY_to_t[(int)(arc_yy + 0.5)];
         arc_zero_T is the reverse perspective coordinate of the center of the line.
         arc_T = arc_zero_T;
         arc_T will be varied down from the center then up.
         do the following for the center and each row below the center:
         {
                  YY = (int)(arc_T + 0.5);
                  YY is the nearest row to this coordinate.
                  distance = (arc_t_to_YY[YY] − arc_zero_yy)*arc_scale;
                  convert T back to rows, use to get distance to center coordinate of line.
                  distance is how far this YY index is from the center of the line.
                  Use standard anti-aliasing profile to convert distance to alpha.
                  Store alpha into texture at row (number of rows −1 − YY) and column XX.
                  Store alpha into same texture row at column (number of columns−1 − XX)
                  arc_T = arc_T − 1;
                  If alpha = 0 or YY = 0, then exit loop
         }
}
```

```
        arc_T = arc_zero_T + 1;
        do the following for each row above the center (same as above/arc_T increments)
        {
                YY = (int)(arc_T + 0.5);
                distance = (arc_t_to_YY[YY] - arc_zero_yy)*arc_scale;
                Use standard anti-aliasing profile to convert distance to alpha.
                Store alpha into texture at row (number of rows -1 - YY) and column XX.
                Store alpha into same texture row at column (number of columns-1 - XX)
                arc_T = arc_T + 1;
                If alpha = 0 or YY = number of rows - 1, then exit loop
        }
        arc_column = arc_column + arc_column_delta;
        Get location of next column along the bottom of the trapezoid.
        XX = XX - 1;
        If XX < 0, then exit loop.
        XX is decremented and loop exits when all columns are done.
}
```

In one embodiment, two look-up tables are generated for performing the compensation for perspective view. The array arc_YY_to_t maps from Y (row) coordinates to T coordinates with reverse perspective correction. The array arc_t_to_YY reverses that mapping to go from reverse perspective corrected T coordinates back to Y coordinates. In the following remember that q_factor is greater than 0 and less than 1. In standard perspective correction of texture, the t coordinate is linearly interpolated from q_factor to 0 and the s and q coordinates are linearly interpolated from 1 to q_factor. These same smooth transitions must be applied to the texture to compensate.

An example algorithm for generating arc_YY_to_t and arc_t_to_YY is now presented:

```
do the following for each row (YY = 0 to number of row-1)
{
        arc_yy = YY/(number of rows - 1);
        arc_yy is the relative offset of this row (0 to 1.0)
        arc_Q = (1.0 - q_factor)*(1.0 - arc_yy) + q_factor;
        arc_Q is the perspective view distortion factor, varies
        from 1.0 to q_factor.
        arc_C = q_factor*arc_yy * (number of rows)/arc_Q;
        arc_C is the texture coordinate after compensation for
                perspective view distortion.
        arc_YY_to_t[number of rows - 1 - YY] =
        number of rows - 1 - arc_C;
        Store in reverse order for algorithm above (arbitrary)
        arc_T = (1.0 - q_factor)*arc_yy + q_factor;
        arc_T is the reverse of arc_Q above and varies
        from q_factor to 0.
        arc_yy = YY/arc_T;
        arc_t_to_YY[(number of rows)-1 - YY] =
        (number of rows)-1 - arc_yy;
}
```

The following is representative of an algorithm for drawing a full trapezoid arc segment, starting at arc_angle for a trapezoid with a given span_angle, inner_radius and outer_radius:

```
span_angle = radial span of trapezoid
q_factor = inner_radius/outer_radius.
arc_x1 = inner_radius*cos(arc_angle)
arc_y1 = inner_radius*sin(arc_angle)
arc_x2 = outer_radius*cos(arc_angle)
arc_y2 = outer_radius*sin(arc_angle)
arc_x3 = inner_radius*cos(arc_angle + span_angle)
arc_y3 = inner_radius*sin(arc_angle + span_angle)
arc_x4 = outer_radius*cos(arc_angle + span_angle)
arc_y4 = outer_radius*sin(arc_angle + span_angle)
Draw trapezoid with following (x,y,z,w,s,t,r,q) coordinates:
(arc_x1, arc_y1, 0, 1, 0, q_factor, 0, q_factor)
(arc_x2, arc_y2, 0, 1, 0, 0, 0, 1)
(arc_x3, arc_y3, 0, 1, q_factor, q_factor, 0, q_factor)
(arc_x4, arc_y4, 0, 1, 1, 0, 0, 1)
```

Notes:
next adjacent trapezoid is drawn with swapped s coordinates to allow efficient polygon mesh. Also, this algorithm represents a standard practice for doing perspective correction of the texture onto a polygon. Arcs can also be drawn right to left by appropriately negating the delta angles.

The following is pseudocode for an algorithm for drawing a final partial trapezoid arc segment of final_delta span starting at arc_angle for a trapezoid with a given span_angle, inner_radius and outer_radius. The perspective texture coordinates are corrected such that the final partial trapezoid is drawn without distortion. Spatially, the final trapezoid will overlay a full trapezoid, but is truncated by the radial at the end angle of the arc.

```
final_delta = radial span of final partial arc segment (final_delta <
span_angle)
final_scale = final_delta/ span_angle
span_offset = span_angle/2 - final_delta;
Get angular offset from center of trapezoid to final angle.
if (span_offset < 0) span_offset = -span_offset;
Get absolute value of angular offset from center of trapezoid to this angle.
final_inner_radius = inner_radius*cos(span_angle/2)/cos(span_offset)
final_outer_radius = outer_radius*cos(span_angle/2)/cos(span_offset)
Get inner and outer radius at center of trapezoid, then increase based on
angular offset from the center.
arc_x1 = inner_radius*cos(arc_angle)
arc_y1 = inner_radius*sin(arc_angle)
arc_x2 = outer_radius*cos(arc_angle)
arc_y2 = outer_radius*sin(arc_angle)
arc_x3 = final_inner_radius*cos(arc_angle + final_delta)
arc_y3 = final_inner_radius*sin(arc_angle + final_delta)
arc_x4 = final_outer_radius*cos(arc_angle + final_delta)
arc_y4 = final_outer_radius*sin(arc_angle + final_delta)
```

-continued

Draw trapezoid with following (x,y,z,w,s,t,r,q) coordinates:
(arc_x1, arc_y1, 0, 1, 0, q_factor, 0, q_factor)
(arc_x2, arc_y2, 0, 1, 0, 0, 0, 1)
(arc_x3, arc_y3, 0, 1, q_factor * final_scale, q_factor, 0, q_factor)
(arc_x4, arc_y4, 0, 1, final_scale, 0, 0, 1)

Notes:
if s = 1 in left side of trapezoid due to swapped s during polygon mesh, then use 1-final_scale in right side s. This algorithm does not represent a standard industry practice.

Table 1 contains a memory dump for a sample arc texture patch. Each entry contains 8 hexadecimal digits. Each byte (two hexadecimal digits) represents the data for a given column. Thus the first 4 columns are in the first 8 digit hex number. The top and bottom rows were all zero and were left off to make the table a reasonable size. A blank entry represents all 0s for legibility. Notice that the outer columns are taller than the inner columns, because of the reverse perspective correction so that the columns appear the same size after perspective correction.

The invention claimed is:

1. A computer implemented method of representing an arc, the method comprising a computer executing the following steps:
   dividing the arc into segments that have vertices;
   selecting a plurality of the vertices;
   obtaining trapezoids corresponding to the vertices;
   obtaining a texture having multiple columns of texels;
   completely representing the trapezoids as triangles; and
   mapping the texture to the triangles using perspective correction, wherein a final trapezoid required to complete the arc is a fraction of the full trapezoids, and wherein standard texture is used for the final trapezoid and wherein adjusted perspective texture coordinates are used to draw a final segment without distortion.

2. The computer implemented method of claim 1 wherein a line profile is applied to each column of the texture to reduce aliasing effects.

3. The computer implemented method of claim 2 wherein the line profile comprises at least one texel column transitioning from dark to light to dark.

TABLE 1

| | | | | | | |
|---|---|---|---|---|---|---|
| | | | 0000090C, | 0C090000, | | |
| | | | 000E1419, | 19140E00, | | |
| | | | 111D282F, | 2F281D11, | | |
| | | 00000010, | 22364751, | 51473622, | 10000000, | |
| | | 00000D21, | 3D5B727E, | 7E725B3D, | 210D0000, | |
| | | 00091B3C, | 6589A3B0, | B0A38965, | 3C1B0900, | |
| | | 00133463, | 94BBD2DC, | DCD2BB94, | 63341300, | |
| | | 0A255793, | C5E5F4F9, | F9F4E5C5, | 9357250A, | |
| | | 164385C4, | ECFCFFFE, | FEFFFCEC, | C4854316, | |
| | 0000000A, | 2B6BB6EB, | FEFBF0E9, | E9F0FBFE, | EBB66B2B, | 0A000000, |
| | 00000015, | 4A9CE1FE, | F7E1CCC1, | C1CCE1F7, | FEE19C4A, | 15000000, |
| | 0000082A, | 75CBFBF8, | D9B69D90, | 909DB6D9, | F8FBCB75, | 2A080000, |
| | 00001149, | A6F0FCDA, | AC856D61, | 616D85AC, | DAFCF0A6, | 49110000, |
| | 00002373, | D4FFE5AE, | 7B58443B, | 3B44587B, | AEE5FFD4, | 73230000, |
| | 000C3EA3, | F5F5BC7D, | 4F342621, | 2126344F, | 7DBCF5F5, | A33E0C00, |
| | 001865D2, | FFD48B51, | 2E1C1410, | 10141C2E, | 518BD4FF, | D2651800, |
| | 002E94F3, | F0A65D2F, | 180E0900, | 00090E18, | 2F5DA6F0, | F3942E00, |
| | 0E4FC4FF, | CC763819, | 0C000000, | 0000000C, | 193876CC, | FFC44F0E, |
| | 1C7AEBF2, | 9D4C1F0C, | | | 0C1F4C9D, | F2EB7A1C, |
| | 34AAFECF, | 6D2C0F00, | | | 000C2C6D, | CFFEAA34, |
| 0000000D, | 57D7F8A0, | 45170000, | | | 00001745, | A0F8D757, | 0D000000, |
| 0000001B, | 83F6DC71, | 270B0000, | | | 00000B27, | 71DCF683, | 1B000000, |
| 00000033, | B4FFB048, | 14000000, | | | 00000014, | 48B0FFB4, | 33000000, |
| 00000B55, | DFEF8029, | 0A000000, | | | 0000000A, | 2980EFDF, | 550B0000, |
| 00001781, | FACA5416, | | | | | 1654CAFA, | 81170000, |
| 00002BB1, | FE9C320A, | | | | | 0A329CFE, | B12B0000, |
| 00004ADD, | E96C1B00, | | | | | 001B6CE9, | DD4A0000, |
| 001074F9, | C3450D00, | | | | | 000D45C3, | F9741000, |
| 001FA3FE, | 93270000, | | | | | 00002793, | FEA31F00, |
| 0039D1EB, | 65140000, | | | | | 00001465, | EBD13900, |
| 095DF2C6, | 3F0A0000, | | | | | 00000A3F, | C6F25D09, |
| 1389FF97, | 24000000, | | | | | 00000024, | 97FF8913, |
| 24B9F469, | 12000000, | | | | | 00000012, | 69F4B924, |
| 40E2D442, | 09000000, | | | | | 00000009, | 42D4E240, |
| 66FBA726, | | | | | | | 26A7FB66, |
| 94FD7814, | | | | | | | 1478FD94, |
| C3E84E09, | | | | | | | 094EE8C3, |
| E9C12E00, | | | | | | | 002EC1E9, |
| FD921900, | | | | | | | 001992FD, |
| FB650C00, | | | | | | | 000C65FB, |
| E2400000, | | | | | | | 000040E2, |
| B9240000, | | | | | | | 000024B9, |
| 8A130000, | | | | | | | 0000138A, |
| 5E090000, | | | | | | | 0000095E, |
| 3A000000, | | | | | | | 0000003A, |
| 21000000, | | | | | | | 00000021, |
| 11000000, | | | | | | | 00000011, |
| 08000000, | | | | | | | 00000008, |

4. The computer implemented method of claim 1, wherein the texture is symmetrical with respect to a midline of the trapezoids.

5. The computer implemented method of claim 1 and further comprising applying a reverse perspective view transformation to individual columns of texels of the texture.

6. The computer implemented method of claim 1 wherein each column of texels represents a single radial bound spatially by trapezoid upper and lower chords.

7. The computer implemented method of claim 1 wherein obtaining a texture comprises selecting a texture from a number of textures based on the size of the radius and line width of the arc.

8. The computer implemented method of claim 1 wherein texture is rectangular, and is mapped into the trapezoid such that each column of the rectangular texture is mapped along a radial bounded by the top and bottom of the trapezoids.

9. The computer implemented method of claim 1, wherein the mapping step includes a reverse mapping of the perspective correction.

* * * * *